United States Patent
Lin (10) Patent No.: US 7,099,692 B2
(45) Date of Patent: Aug. 29, 2006

(54) INFRARED TRANSCEIVER MODULE FOR A WIDER WORKING RANGE

(75) Inventor: Wen-Kuan Lin, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 500 days.

(21) Appl. No.: 10/442,920

(22) Filed: May 22, 2003

(65) Prior Publication Data

US 2004/0077312 A1    Apr. 22, 2004

(30) Foreign Application Priority Data

Oct. 16, 2002    (TW) .............................. 91216473 U (51) Int. Cl.
*H04B 1/38*    (2006.01)
*H04M 1/00*    (2006.01)

(52) U.S. Cl. .................... 455/557; 455/41.2; 455/41.1; 455/556.2; 455/81; 455/559; 709/227; 709/217; 709/250; 430/201; 430/964; 430/271.1; 385/34; 385/88; 385/44

(58) Field of Classification Search ............... 455/3.06, 455/41.1, 41.2, 81, 556.1, 557, 556.2, 559; 709/217, 248, 227, 250; 430/201, 964, 271.1; 385/34, 44, 88

See application file for complete search history.

(56) References Cited

U.S. PATENT DOCUMENTS

| | | | | |
|---|---|---|---|---|
| 6,088,346 A | * | 7/2000 | Du et al. ..................... | 370/338 |
| 6,098,138 A | * | 8/2000 | Martinelli et al. .......... | 710/315 |
| 6,144,997 A | * | 11/2000 | Lamming et al. ........... | 709/217 |
| 6,615,239 B1 | * | 9/2003 | Berstis ....................... | 709/204 |
| 6,678,535 B1 | * | 1/2004 | Narayanaswami .......... | 455/557 |
| 6,717,801 B1 | * | 4/2004 | Castell et al. ............... | 361/683 |

\* cited by examiner

*Primary Examiner*—Marceau Milord
(74) *Attorney, Agent, or Firm*—Birch, Stewart, Kolasch & Birch, LLP.

(57) ABSTRACT

An infrared transceiver module for enabling a multiple direction infrared communication includes a transfer element for enlarging the working angles of infrared emission and reception of a transmitter and receiver portion. The transfer element has a surface area larger than the surface area of the transmitter and receiver portion. Infrared signal beam transmitting from the transmitter and receiver portion is repeatedly refracted by said transfer element and transmitted in multiple directions from the transfer element. Exterior signal beams coming to any portion of the transfer element are also repeatedly refracted by said transfer element and received by said transmitter and receiver portion. Therefore, a multiple direction infrared transmission and reception is obtained.

15 Claims, 8 Drawing Sheets

INFRARED TRANSCEIVER MODULE FOR A WIDER WORKING RANGE

BACKGROUND OF THE INVENTION

1. Field of the Invention

The invention generally relates to an infrared transceiver module, and particularly relates to an infrared transceiver module having a wider transmission and reception angle, in which infrared signals are transmitted and received from multiple directions.

2. Related Art

Data transmission through infrared is a known technique. Infrared signals transmitted and received for wireless communication avoids physical wiring and makes products portable. Therefore, infrared transmission has been widely used in personal computers, notebook computers, personal digital assistants, mobile phones, remote controls and so on.

Figure 1A:
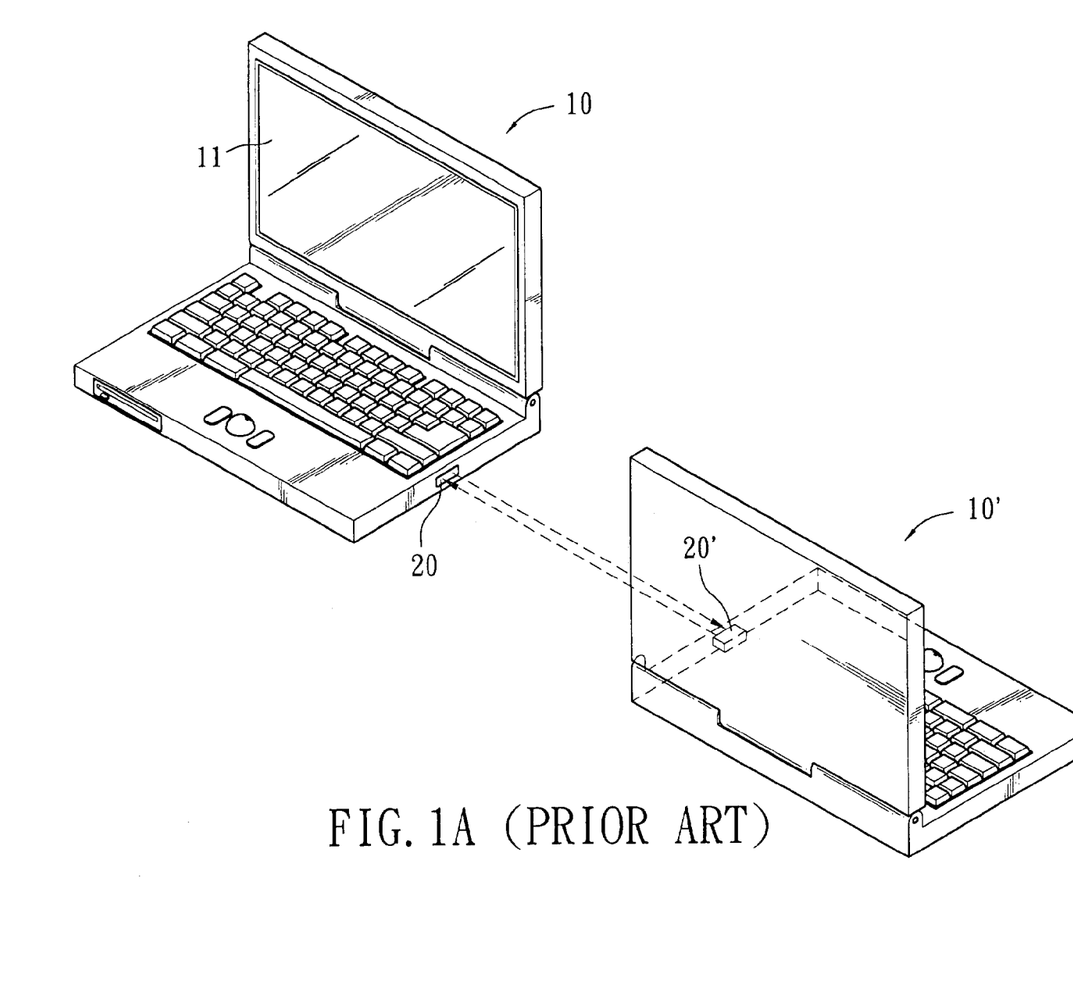
FIGS. 1A, 1B are descriptive views of electronic devices with conventional infrared transceivers for communication.
Figure 1B:
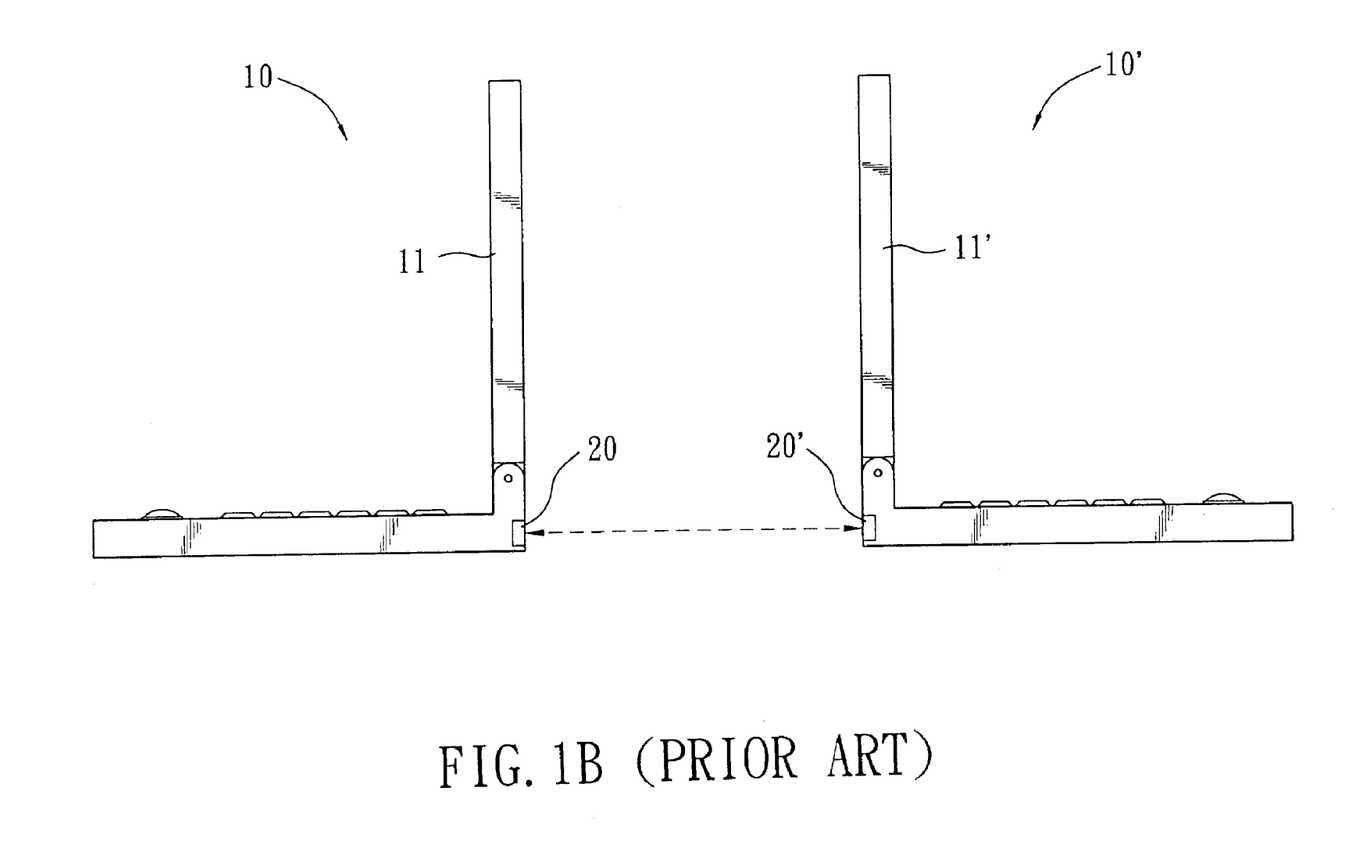

In computers, for example, data communication between two computers can be made through infrared transmission in a convenient way, besides networks and movable storage media, especially when the two are nearby. As shown in FIGS. 1A and 1B, two computers 10, 10' having infrared transceiver 20, 20' respectively communicate by two transceivers 20, 20' facing to each other. Since the two transceivers 20, 20' work in specific directions, they have to be aligned with each other so that the infrared signals transmitted from the transceiver 20 of the computer 10 can be received by the transceiver 20' of the computer 10', or vice versa.

Though an infrared transceiver can be mounted on any side of a computer, the computers of a same series should have transceivers at the same sides. As a result, when positioning two computers of the same series, the computers have to be placed in opposite directions as shown in FIGS. 1A and 1B, in which the displays 11 of the computers 10, 10' are facing to different directions that a user cannot monitor them at the same time and encounters inconvenience.

Figure 2:
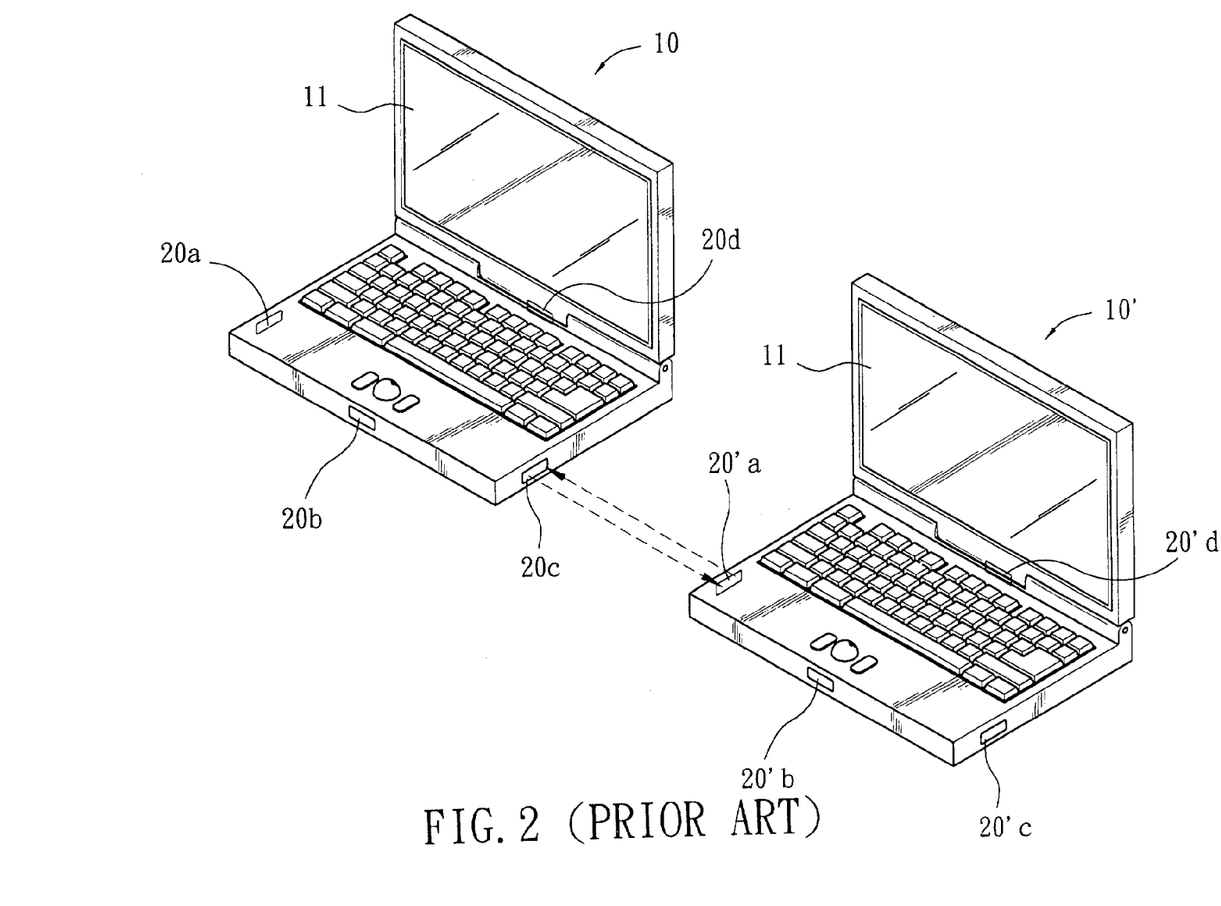
FIG. 2 is a descriptive view of electronic devices with multiple conventional infrared transceivers for communication.

A possible solution for the aforesaid problem is to equip each computer 10, 10' with four transceivers 20a, 20b, 20c, 20d and 20'a, 20'b, 20'c, 20'd at each sides so that two specific transceivers at corresponding sides of the computers 10, 10' can communicate well. Though this method makes communication possible without limitation of the computer positions, it needs more transceivers, such as more threes 20b, 20c, 20d and 20'b, 20'c, 20'd, that costs more on the transceivers themselves and the related circuits in the computers 10, 10'.

All these multiple directional transceivers require positional adjustments for communication in specific directions. Therefore, it is desired to develop an infrared transceiver module having a wider working range of transmitting and receiving infrared signals in multiple directions without the need of adjusting the position of the transceiver.

SUMMARY OF THE INVENTION

The object of the invention is to provide an infrared transceiver module having a wider working range of transmitting and receiving infrared signals in multiple directions without the need of adjusting the position of the transceiver.

A wide-range infrared transceiver module according to the invention includes an infrared transceiver and a transfer element. The transceiver includes an infrared transmitter and receiver portion for transmitting infrared signals outwards and receiving infrared signals coming from exterior. The transfer element is mounted near the transceiver for transferring infrared signals with a surface area larger than the transceiver.

When the transmitter and receiver portion transmits infrared signals, the infrared beam irradiates into the transfer element, repeatedly refracted in the transfer element and transmits in multiple directions. On the contrary, when an exterior infrared signal comes to the transfer element, the infrared beam irradiates into the transfer element, repeatedly refracted by the transfer element and finally received by the transmitter and receiver portion.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 3:
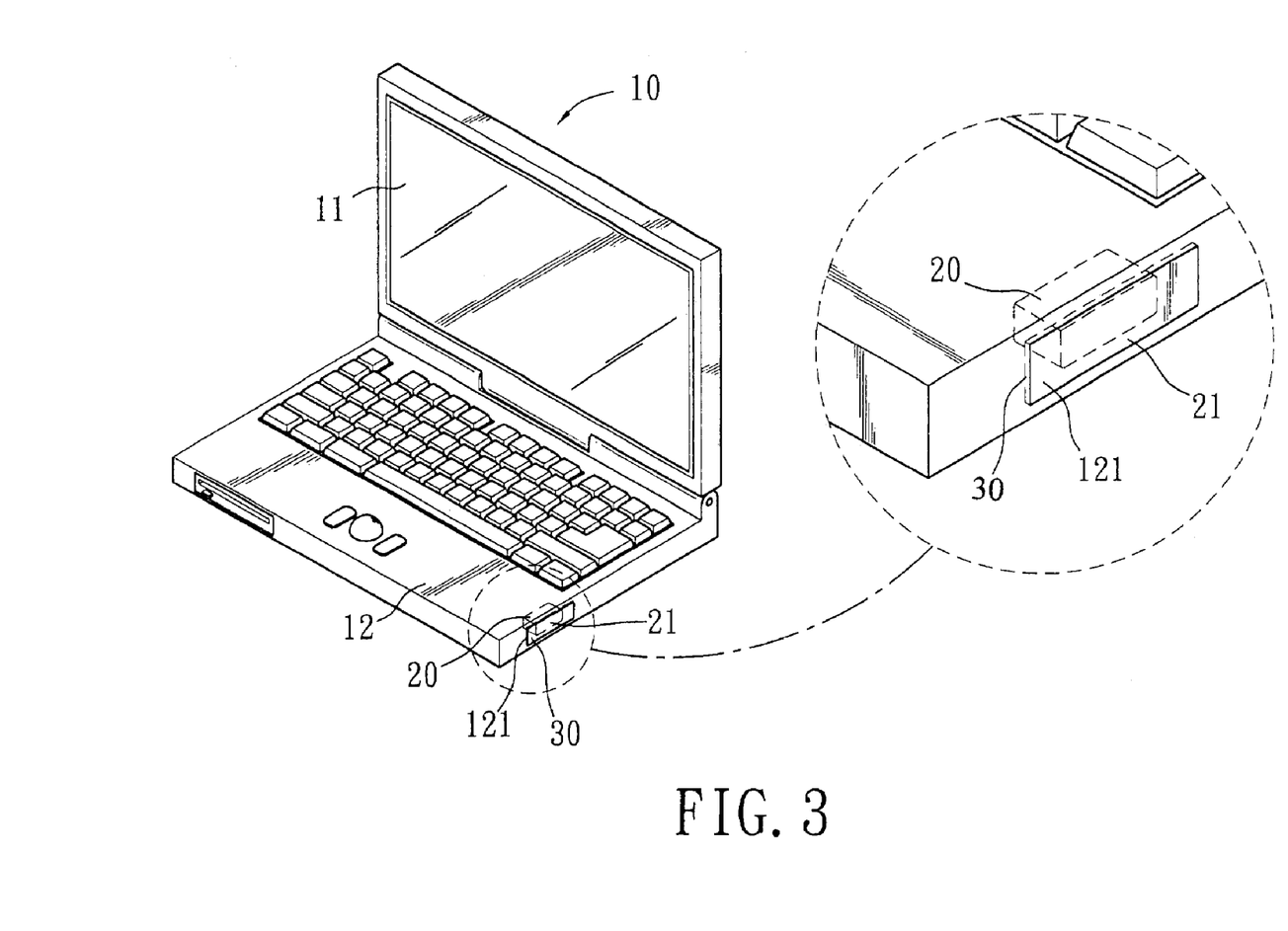
FIG. 3 is a descriptive view of a first embodiment of the invention.

As shown in FIG. 3, a wide-range infrared transceiver module according to the invention is applied to an electronic device 10, such as a computer, for providing data communication through infrared signals transmission and reception. The transceiver module is mounted in a hole 121 formed on one side of a case 12 of the device 10, and composed of a transceiver 20 and a transfer element 30. The transceiver 20 includes an infrared transmitter and receiver portion 21 mounted adjacent to the transfer element 30. The transfer element 30 is mainly a plate element mounted in the hole 121 and extrudes from the case 12 for transferring infrared signals. The transfer element 30 is made of a light-permeable material and has a surface area larger than the surface area of the transmitter and receiver portion 21.

Figure 4:
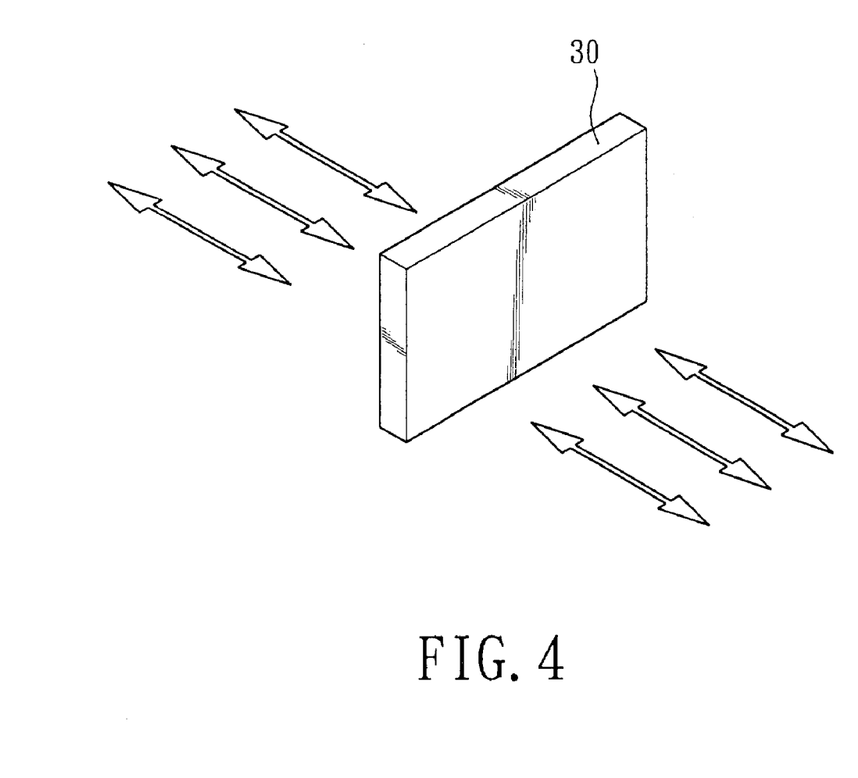
FIG. 4 is a functional view of a transfer element in the first embodiment of the invention.

As shown in FIGS. 3 and 4, when infrared signals transmitted from the infrared transmitter and receiver portion 21, the infrared beam irradiates into the transfer element 30, repeatedly refracted by the transfer element and transmits from the transfer element in multiple directions. On the contrary, when an exterior infrared signal comes to the transfer element 30 at any direction, the infrared beam irradiates into the transfer element, repeatedly refracted by the transfer element and finally received by the infrared transmitter and receiver portion 21. Because the transfer element 30 has a surface area larger than that of the transmitter and receiver portion 21, the infrared signal transfer range is enlarged.

Figure 5:
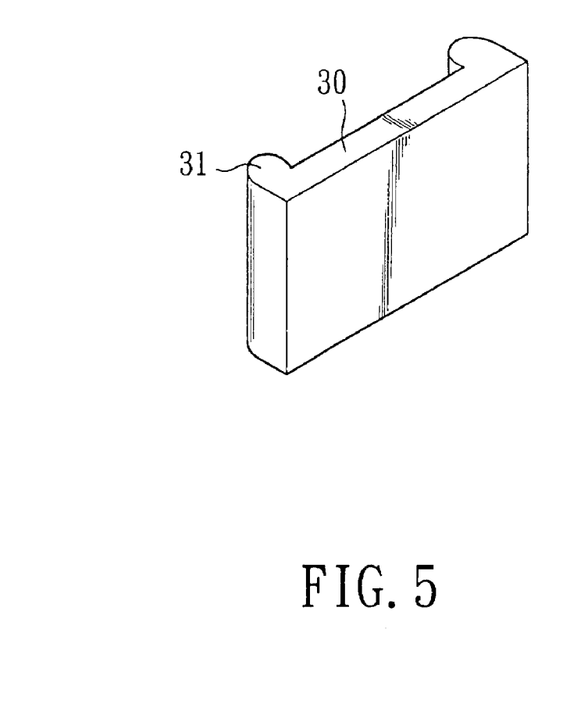
FIG. 5 is another transfer element applicable in the first embodiment of the invention.

As shown in FIG. 5, the transfer element 30 can be formed with fastening portions 31 at both ends for fixing the transfer element 30 to the case 12.

Figure 6:
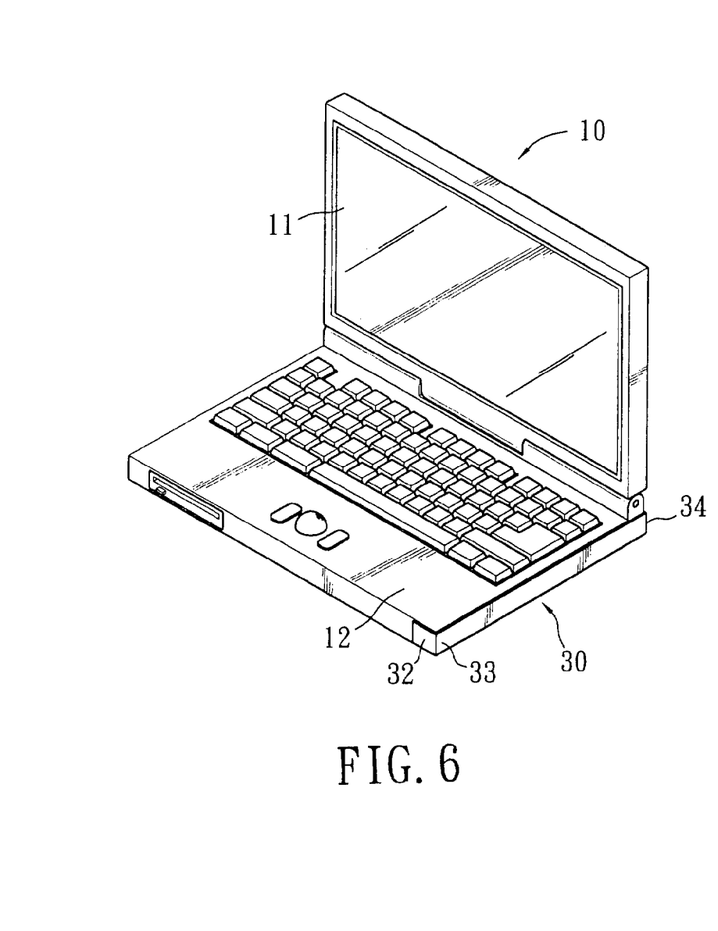
FIG. 6 is a descriptive view of a second embodiment of the invention.

FIG. 6 shows a second embodiment of the invention. Similar to the first embodiment of FIG. 3, a wide-range infrared transceiver module according to the invention is applied to an electronic device 10, such as a computer, for providing data communication through infrared signals transmission and receiving. The transceiver module is mounted on one side of a case 12 of the device 10, and composed of a transceiver 20 and a transfer element 30. The transceiver 20 includes an infrared transmitter and receiver portion 21 mounted adjacent to the transfer element 30. The transfer element 30 includes a first plate 32, a second plate 33 and a third plate 34 linked as a unit and extrudes from the case 12 for transferring infrared signals. The transfer element 30 is made of a light-permeable material and having a surface area larger than the surface area of the transmitter and receiver portion 21.

Figure 7:
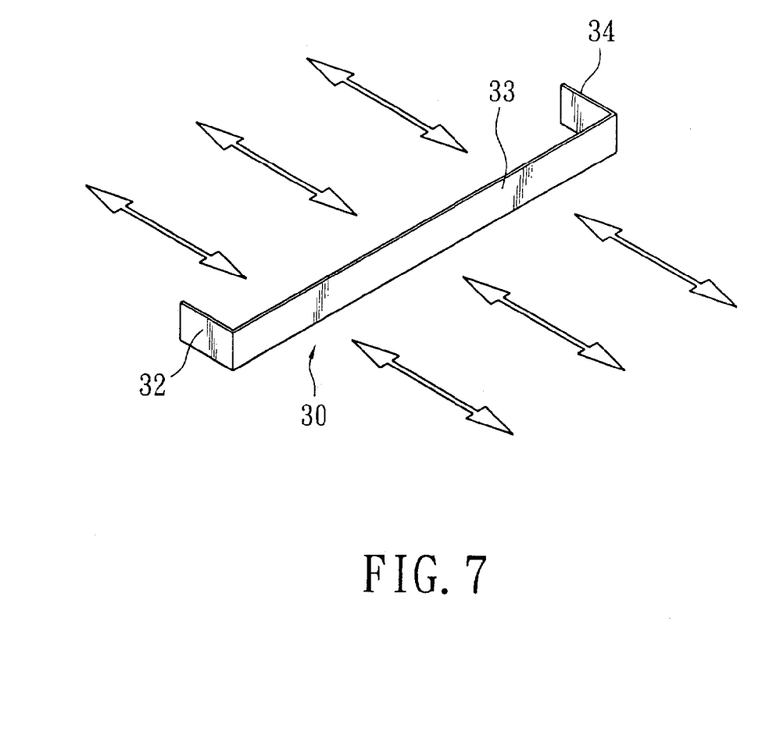
FIG. 7 is a functional view of a transfer element in the second embodiment of the invention.

As shown in FIGS. 6 and 7, when infrared signal transmitted from the infrared transmitter and receiver portion 21, the infrared beam irradiates into the transfer element 30, repeatedly refracted in the transfer element 30 and transmits from the transfer element 30 in multiple directions. On the contrary, when exterior infrared signal comes to the transfer element 30 at any direction or any portion of the first plate 32, second plate 33 and third plate 34, the infrared irradiates into the transfer element 30, repeatedly refracted by the transfer element 30 and finally received by the infrared transmitter and receiver portion 21. Because the transfer element 30 has a surface area larger than that of the transmitter and receiver portion 21, the infrared signal transfer range is enlarged.

Figure 8:
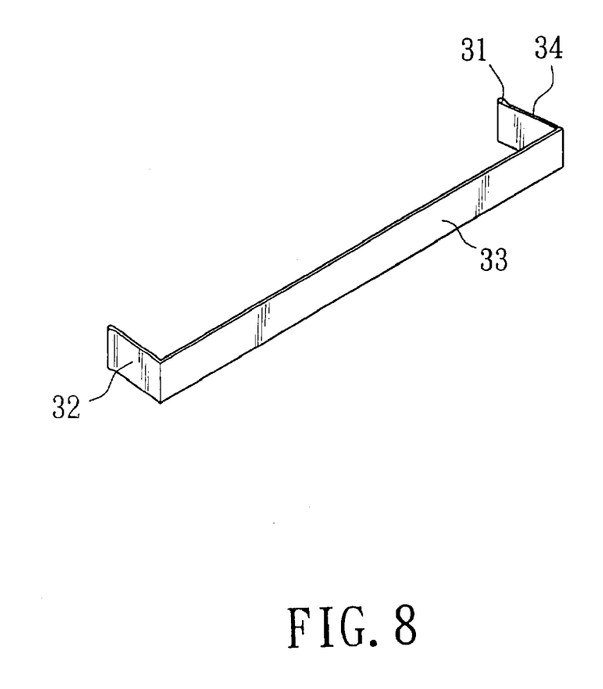
FIG. 8 is another transfer element applicable in the second embodiment of the invention.

As shown in FIG. 8, the transfer element 30 can be formed with fastening portions 31 at both ends, i.e., ends of the first and third plates 32, 34, so as to fix the transfer element 30 to the case 12.

Figure 9:
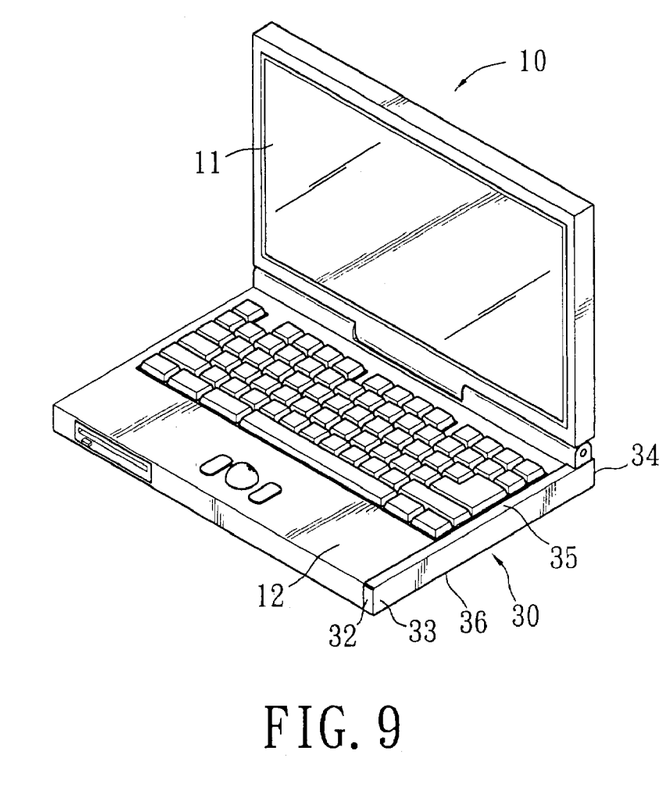
FIG. 9 is a descriptive view of a third embodiment of the invention.

FIG. 9 shows a second embodiment of the invention. Similar to the first and second embodiments of FIGS. 3 and 6, a wide-range infrared transceiver module according to the invention is applied to an electronic device 10, such as a computer, for providing data communication ability through infrared signals transmission and reception. The transceiver module is mounted on one side of a case 12 of the device 10, and composed of a transceiver 20 and a transfer element 30. The transceiver 20 includes an infrared transmitter and receiver portion 21 mounted adjacent to the transfer element 30. The transfer element 30 includes a first plate 32, a second plate 33, a third plate 34, a fourth plate 35 and a fifth plate 36 linked as a cap-like unit and extrudes from the case 12 for transferring infrared signals. The transfer element 30 is made of a light-permeable material and has a surface area larger than the surface area of the transmitter and receiver portion 21.

Figure 10:
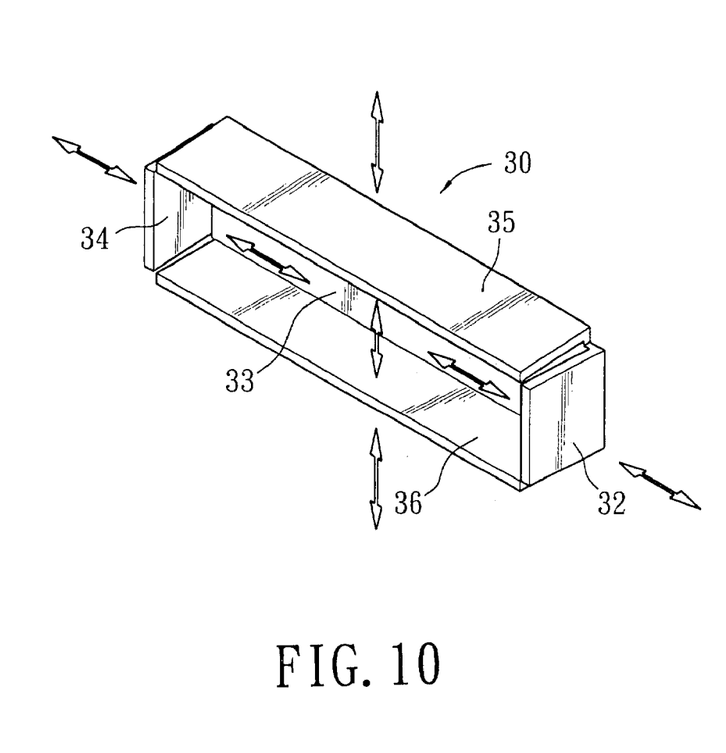
FIG. 10 is a functional view of a transfer element in the third embodiment of the invention.

As shown in FIGS. 9 and 10, when infrared signal transmitted from the infrared transmitter and receiver portion 21, the infrared beam irradiates into the transfer element 30, repeatedly refracted by the transfer element 30 and transmits from the transfer element 30 in multiple directions. On the contrary, when exterior infrared signal comes to the transfer element 30 at any direction or any portion of the first plate 32, second plate 33, third plate 34, fourth plate 35 and fifth plate 36, the infrared beam irradiates into the transfer element 30, repeatedly refracted by the transfer element 30 and finally received by the infrared transmitter and receiver portion 21. Because the transfer element 30 has a surface area larger than that of the transmitter and receiver portion 21, the infrared signal transfer range is enlarged.

Figure 11:
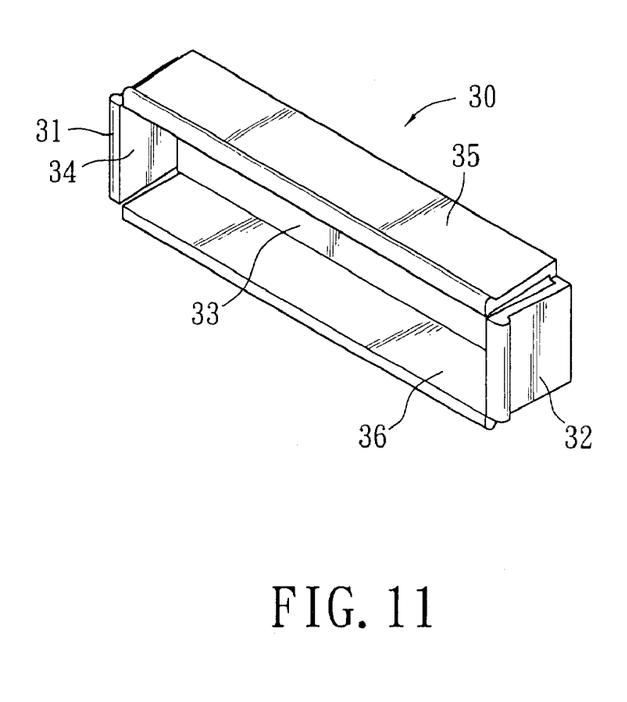
FIG. 11 is another transfer element applicable in the third embodiment of the invention.

As shown in FIG. 11, the transfer element 30 can be formed with fastening portions 31 on four sides, i.e., sides of the first, third, fourth and fifth plates 32, 34, 35, 36, so as to fix the transfer element 30 to the case 12.

In the aforesaid embodiments, the infrared transceiver 20 and the transfer element 30 form a transceiver module to be mounted on the case 12 of an electronic device 10. The surface of the transmitter and receiver potion 21 of the transceiver 20 and the inner surface of the transfer element 30 are preferably formed with unparallel or uneven planes so that infrared beams irradiate to or from the transmitter and receiver potion 21 and the transfer element 30 are refracted thereby and enlarged with their emission and reception angles.

In conclusion, the infrared transceiver module of the invention includes a transfer element 30 for enlarging the working angles of infrared emission and reception, so the transceiver module does not require any positional adjustment for achieving a multiple direction infrared communication.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wide-range infrared transceiver module applicable to an electronic device, comprising:

an infrared transceiver having an transmitter and receiver portion for transmitting and receiving infrared signals; and a transfer element, mounted correspondingly to said transmitter and receiver portion, having a surface area larger than surface area of said transmitter and receiver portion, said transfer element being formed with a first plate, a second plate, a third plate, a fourth plate and a fifth plate, the second plate having four sides which are linked with the first plate, the third plate, the fourth plate and the fifth plate thus making a cap-shaped transfer element;

therefore, infrared signal beam transmitting from said transmitter and receiver portion are repeatedly refracted by said transfer element and transmitted in multiple directions from said transfer element; exterior signal beams coming to any portion of said transfer element are repeatedly refracted by said transfer element and received by said transmitter and receiver portion.

2. A wide-range infrared transceiver module according to claim 1 wherein said transfer element is a plate member.

3. A wide-range infrared transceiver module according to claim 1 wherein two ends of said transfer element are formed with fastening portions for fixing said transfer element to said electronic device.

4. A wide-range infrared transceiver module applicable to an electronic device comprising:
  an infrared transceiver having a transmitter and receiver portion for transmitting and receiving infrared signals; and
  a transfer element, mounted correspondingly to said transmitter and receiver portion, having a surface area larger than a surface area of the transmitter and receiver portion wherein said transfer element is formed with a first plate, a second plate and a third plate; two ends of said second plate are linked with said first plate and said third plate;
  an infrared signal bean transmitting from said transmitter and receiver portion being repeatedly refracted by said transfer element and transmitted in multiple directions from said transfer element, exterior signal beams coming to any portion of said transfer element being repeatedly refracted by said transfer element and received by said transmitter and receiver portion.

5. A wide-range infrared transceiver module according to claim 4 wherein said first plate and said third plate are formed with fastening portions for fixing said transfer element to said electronic device.

6. A wide-range infrared receiver module applicable to an electronic device, comprising:
  an infrared receiver having a receiver portion for receiving infrared signals; and
  a transfer element, mounted correspondingly to said receiver portion, having a surface area larger than surface area of said receiver portion wherein said transfer element is formed with a first plate, a second plate, a third plate, a fourth plate and a fifth plate, four sides of said second plate being linked with the first plate, the third plate, the fourth plate and the fifth plate and making a cap-shaped transfer element;
  therefore, exterior signal beams coming to any portion of said transfer element are repeatedly refracted by said transfer element and received by said receiver portion.

7. A wide-range infrared receiver module according to claim 6 wherein said transfer element is a plate member.

8. A wide-range infrared receiver module according to claim 7 wherein two ends of said transfer element are formed with fastening portions for fixing said transfer element to said electronic device.

9. A wide-range infrared receiver module applicable to an electronic device comprising:
  an infrared receiver having a receiver portion for receiving infrared signals; and
  a transfer element mounted correspondingly to said receiver portion, having a surface area larger than a surface area of said receiver portion wherein said transfer element is formed with a first plate, a second plate and a third plate; two ends of said second plate are linked with said first plate and said third plate;
  exterior signal beams coming to any portion of said transfer element being repeatedly refracted by said transfer element and received by said receiver portion.

10. A wide-range infrared receiver module according to claim 9 wherein said first plate and said third plate are formed with fastening portions for fixing said transfer element to said electronic device.

11. A wide-range infrared transmitter module applicable to an electronic device, comprising:
  an infrared transmitter having an transmitter portion for receiving infrared signals; and
  a transfer element, mounted correspondingly to said transmitter portion, having a surface area larger than surface area of said transmitter portion wherein said transfer element is formed with a first plate, a second plate, a third plate, a fourth plate and a fifth plate, fours sides of said second plate being linked with the first plate, the third plate, the fourth plate and the fifth plate to make a cap-shaped transfer element;
  therefore, infrared signal beam transmitting from said transmitter portion are repeatedly refracted by said transfer element and transmitted in multiple directions from said transfer element.

12. A wide-range infrared transmitter module according to claim 11 wherein said transfer element is a plate member.

13. A wide-range infrared transmitter module according to claim 12 wherein two ends of said transfer element are formed with fastening portions for fixing said transfer element to said electronic device.

14. A wide-range infrared transmitter module applicable to an electronic device, comprising:
  an infrared transmitter having a transmitter portion for receiving infrared signals; and
  a transfer element mounted correspondingly to said transmitter portion, having a surface area larger than a surface area of said transmitter portion wherein said transfer element is formed with a first plate, a second plate and a third plate; two ends of said second plate are linked with said first plate and said third plate;
  infrared signal beams transmitting from said transmitter portion being repeatedly refracted by said transfer element and transmitted in multiple directions from said transfer element.

15. A wide-range infrared transmitter module according to claim 14 wherein said first plate and said third plate are formed with fastening portions for fixing said transfer element to said electronic device.

* * * * *